US012474119B2

(12) United States Patent
Taets von Amerongen et al.

(10) Patent No.: US 12,474,119 B2
(45) Date of Patent: Nov. 18, 2025

(54) SHIELDING SHOE FOR WALKING BEAM FURNACES

(71) Applicant: ANDRITZ Metals Germany GmbH, Hemer (DE)

(72) Inventors: Dankmar Taets von Amerongen, Lüdenscheid (DE); Boris Kofmann, Krefeld (DE); Maicon Piske, Duisburg (DE)

(73) Assignee: ANDRITZ Metals Germany GmbH, Hemer (DE)

( * ) Notice: Subject to any disclaimer, the term of this patent is extended or adjusted under 35 U.S.C. 154(b) by 359 days.

(21) Appl. No.: 18/259,660

(22) PCT Filed: Nov. 9, 2021

(86) PCT No.: PCT/EP2021/081050
§ 371 (c)(1),
(2) Date: Jun. 28, 2023

(87) PCT Pub. No.: WO2022/156932
PCT Pub. Date: Jul. 28, 2022

(65) Prior Publication Data
US 2024/0318916 A1 Sep. 26, 2024

(30) Foreign Application Priority Data
Jan. 21, 2021 (AT) .............................. A 50030/2021

(51) Int. Cl.
*F27B 9/00* (2006.01)
*F27B 9/20* (2006.01)
(Continued)

(52) U.S. Cl.
CPC .......... *F27D 99/0073* (2013.01); *F27B 9/201* (2013.01); *F27D 3/00* (2013.01); *F27D 2003/0048* (2013.01)

(58) Field of Classification Search
CPC .......... F27B 9/20; F27B 9/201; F27D 1/0033; F27D 3/00; F27D 2003/0048; F27D 99/0073
See application file for complete search history.

(56) References Cited

U.S. PATENT DOCUMENTS 4,741,695 A * 5/1988 Ushijima ................ F27B 9/201 414/156
4,838,785 A 6/1989 Campbell, Jr.
(Continued)

FOREIGN PATENT DOCUMENTS

DE 2204602 B1 5/1973
DE 202019002656 U1 9/2020
(Continued)

OTHER PUBLICATIONS

Campbell, Jr., Frank et al., "Walking beam furnace well-way slot covers at Rouge Steel," Iron and Steel Engineer, vol. 70, No. 7, p. 17-22, Jul. 1, 1993.
(Continued)

*Primary Examiner* — Gregory A Wilson
(74) *Attorney, Agent, or Firm* — Alix, Yale & Ristas, LLP

(57) ABSTRACT

The subject of the present invention is a shielding shoe for covering openings in the bottom of a walking beam furnace, the shielding shoe having a semi-circular recess and can thereby be taken up by a vertical support of the walking beam furnace. The shielding shoe consists essentially of refractory cast concrete or refractory rammed concrete and, according to the invention, has a honeycomb-like structure below the shielding jacket. The present invention also relates to a walking beam furnace with such shielding shoes.

17 Claims, 2 Drawing Sheets

(51) Int. Cl.
*F27D 3/00* (2006.01)
*F27D 99/00* (2010.01)

(56) References Cited

U.S. PATENT DOCUMENTS

| | | | | | |
|---|---|---|---|---|---|
| 4,863,376 | A | | 9/1989 | Springer et al. | |
| 5,184,953 | A | * | 2/1993 | McDermott .............. | F27B 9/12<br>432/127 |
| 5,271,610 | A | * | 12/1993 | Klotz ....................... | F27D 3/022<br>432/234 |

FOREIGN PATENT DOCUMENTS

| | | | | | |
|---|---|---|---|---|---|
| EP | 0711970 | A1 | | 5/1996 | |
| EP | 4092366 | A1 | * | 11/2022 | ......... F27D 99/0073 |
| JP | 59200717 | A | | 11/1984 | |
| JP | 6082451 | U | | 6/1985 | |
| JP | 6241060 | U | | 3/1987 | |
| JP | 05163547 | A | | 6/1993 | |
| JP | 2880574 | B2 | * | 4/1999 | .............. F27B 3/085 |
| JP | 2000290722 | A | * | 10/2000 | |
| KR | 20030053099 | A | | 6/2003 | |

OTHER PUBLICATIONS

International Search Report mailed Mar. 1, 2022 for International Patent Application No. PCT/EP2021/081050.

* cited by examiner

SHIELDING SHOE FOR WALKING BEAM FURNACES

BACKGROUND

The subject of the disclosure is a shielding shoe for covering openings in the bottom of a walking beam furnace. The shielding shoe is attached to a vertical support of the walking beam furnace in the area of a semi-circular recess and essentially consists of refractory cast concrete or refractory rammed concrete.

A walking beam furnace, with shielding shoe according is also disclosed herein.

The shielding shoe is a refractory prefabricated part which is installed to cover the scale funnels and slot openings in the bottom of walking beam furnaces. Walking beam furnaces are used in rolling mill plants to heat slabs, ingots or billets to rolling temperature. The walking beam conveyors consist of walking beams which are supported by vertical supports, the so-called supports, also called support tubes or lifting support tubes, and to which the working movement is given in the form of a rectangular orbit over the supports. The latter consist of high-strength steel pipes with ceramic jackets and associated pipe cooling. The supports pass through approximate slot-shaped openings at the bottom of the oven, whereby the drive of the walking beam conveyor together with additional units can be arranged below the bottom of the oven or the oven floor. Two shielding shoes per support are fixed above the slots and are thus intended to avoid or reduce the loss of energy from the oven due to direct radiation into the water cup. The shielding shoes are subject to heavy wear and must therefore be replaced at certain intervals.

The state-of-the-art shielding shoes are made of fireproof concrete with a fixing plate welded to the support. Slotted pins of various lengths are arranged on the sheet to fix the refractory concrete to the sheet. Two shielding shoes are each placed on a separate plate-like steel bracket to accommodate the increased weight of the prefabricated components.

Conventional shielding shoes have the following disadvantages:

- These shielding shoes are heavy and have a weight of approximately 100 kg-120 kg depending on size and design.
- Assembly/disassembly is also rather complicated due to the difficulty of using lifting aids. Furthermore, when installing or changing the shielding shoe, cutting and welding work must be carried out which is subject to a special hazard and must also be approved as "hot work".
- The refractory cast concrete of the shielding shoe is "green" as delivered and thus not thermally treated due to the metallic components used. This also results in a limited storage time for the shielding shoe.

From DE 20 2019 002 656 U1, a shielding shoe is already known which has a steel-free shielding body and is thus already fired or sintered before assembly. However, the shielding shoe according to DE 20 2019 002 656 U1 is equally a heavy, unwieldy component that is difficult to assemble in confined spaces such as those found in walking beam furnaces.

SUMMARY

The inventive embodiments disclosed herein provide a shielding shoe that can be mounted more easily.

The disclosed shielding shoe has a honeycomb-like structure underneath the shielding jacket. The honeycomb-like structure is also made of refractory cast concrete or refractory rammed concrete. Thus, the shielding shoe essentially consists only of cast and fired (up to 1,400° C. possible) refractory cast concrete or refractory rammed concrete.

The honeycomb structure makes the shielding shoe considerably lighter than conventional shielding shoes. A weight saving of more than 35% is possible. The honeycomb-like structure nevertheless ensures the required stability.

Preferably, the shielding jacket above the honeycomb-like structure has a constant thickness. This minimises stresses in the material.

It is favourable if the honeycomb structure, i.e. the webs of the honeycombs, have a uniform wall thickness; this also reduces stresses.

In a preferred embodiment, the shielding shoe has curved slots in the area of the recess for the support, which are C-shaped in top view, for example, so that it can be hooked onto holding clamps attached to the support. The curved clamps ensure a secure hold. In addition, the shielding shoe can rest on a supporting ring attached to the support. It is advantageous if a holding clamp and a supporting ring half each form a one-piece component, which makes assembly on the support particularly easy. However, they can also be separate components.

Preferably, the shielding shoe has at least one, preferably two, clamp holes on its upper side, i.e. in the shielding jacket. Clamps can then be turned into these clamp holes as an assembly aid.

Normally, two shielding shoes are mounted per support. To prevent falling scale from coming to rest on the two shielding shoes, the shielding jacket slopes downwards towards the edges so that falling scale slides off it. Consequently, the two shielding shoes form an umbrella shape.

Also disclosed is a walking beam furnace having at least one support projecting through an opening in the bottom of the walking beam furnace. As disclosed herein, two of the shielding shoes are attached to the support.

BRIEF DESCRIPTION OF THE DRAWINGS

In the following, the state of the art and an embodiment of the invention is described on the basis of drawings. In these drawings.

DETAILED DESCRIPTION

Figure 1:
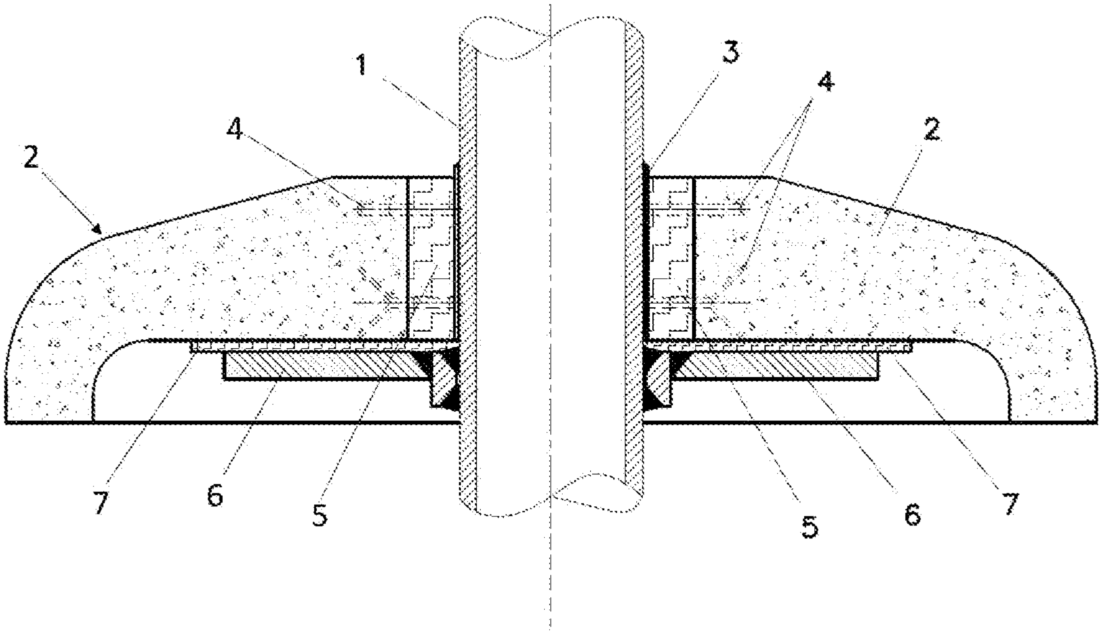
Fig. 1 (Prior Art)
FIG. 1 is a schematic cross-section through two shielding shoes attached to a support according to the state of the art.
Figure 2:
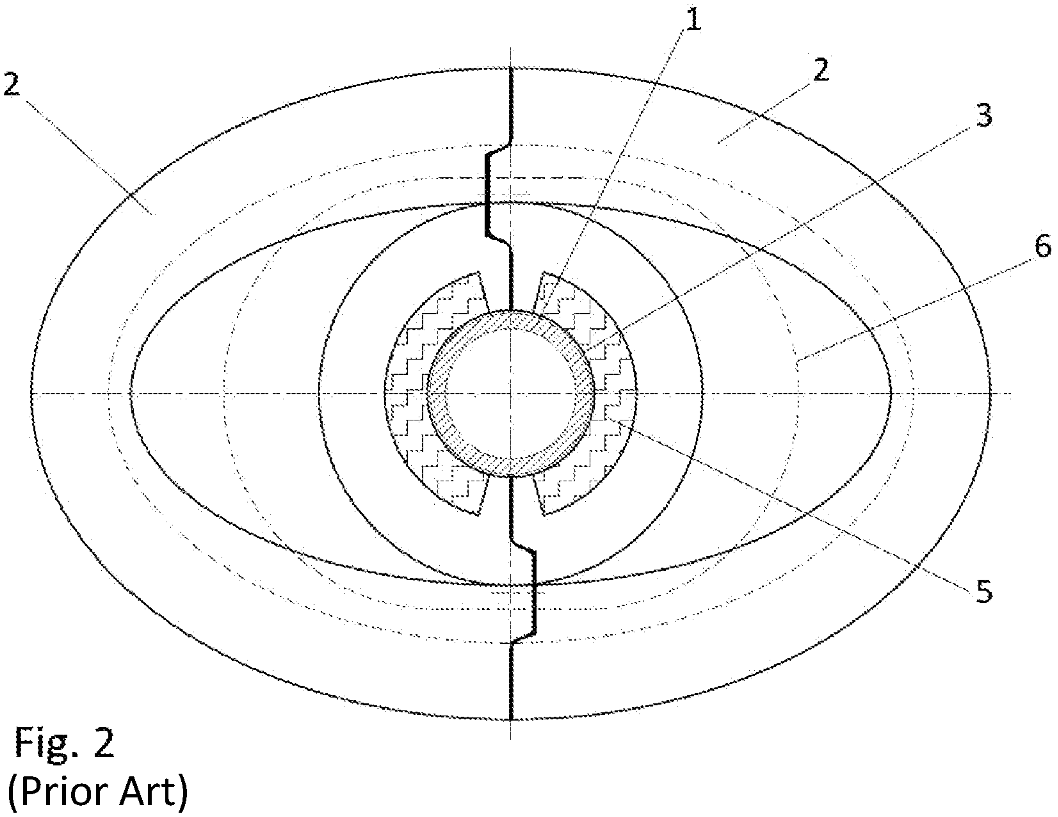
Fig. 2 (Prior Art)
FIG. 2 shows a top view of the shielding shoes in FIG. 1.

FIG. 1 and FIG. 2 each show two conventional shielding shoes 2 attached to a support 1. These shielding shoes 2 are each usually composed of:

- refractory cast concrete with the density of 2.5-3.0 kg/dm$^3$;
- a sheet 3 adapted to the diameter of the support 1;
- slotted pins 4 (anchors);
- of the ceramic fibre mat 5.

The ceramic fibre mat 5 is attached to the rolled sheet 3 with the anchors already welded on as slotted pins 4. Then the slotted pins 4 are spread apart. The entire unit forms a shielding shoe 2 with the refractory cast concrete cast in a mould.

A halved cast plate 6 (also called a plate) is used for mounting and supporting the shielding shoe 2. The two parts (left and right) of the cast plate 6 are placed on the support 1 in a predetermined position, welded on and covered with a ceramic fibre mat 7.

Two shielding shoes 2 are needed to completely cover the slot in the floor. During assembly, one shielding shoe 2 is placed on one half of the cast plate 6 and the other on the second half. Both shielding shoes 2 are welded to the support 1 with the rolled sheet 3.

To change a shielding shoe 2, the welded-on sheets 3 must be detached from the support 1 and the sheets 3 of the new shielding shoes 2 must be welded on again at the same position.

Figure 3:
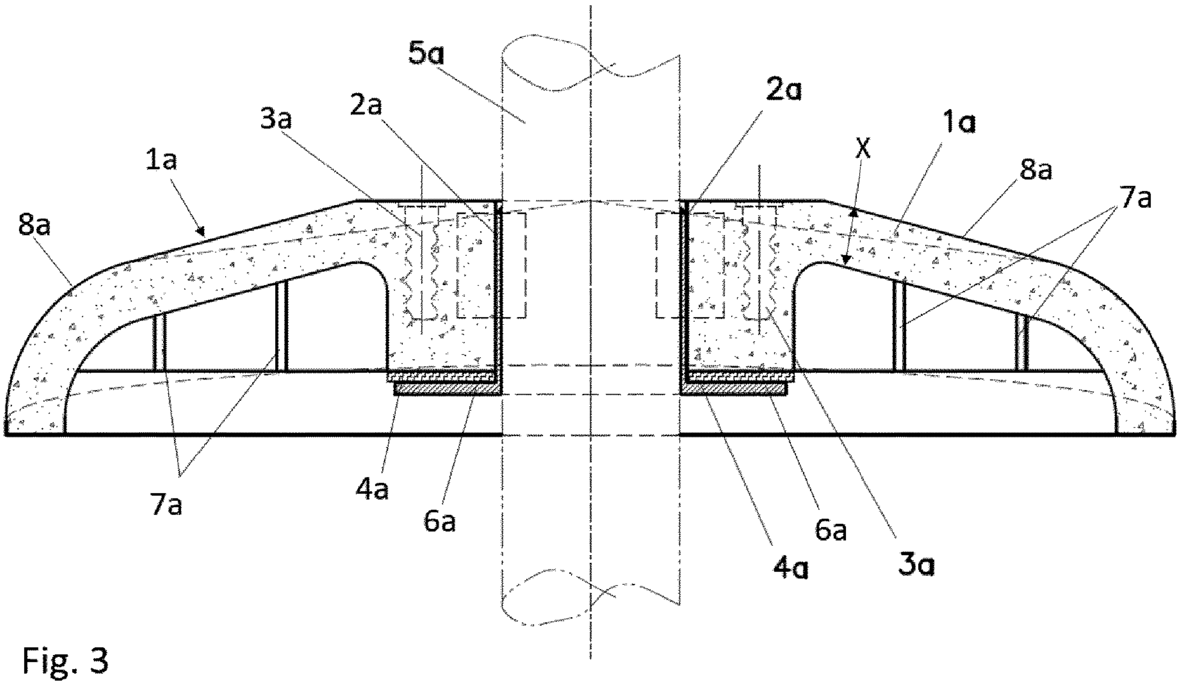
FIG. 3 shows a schematic cross section through two of the disclosed shielding shoes.
Figure 4:
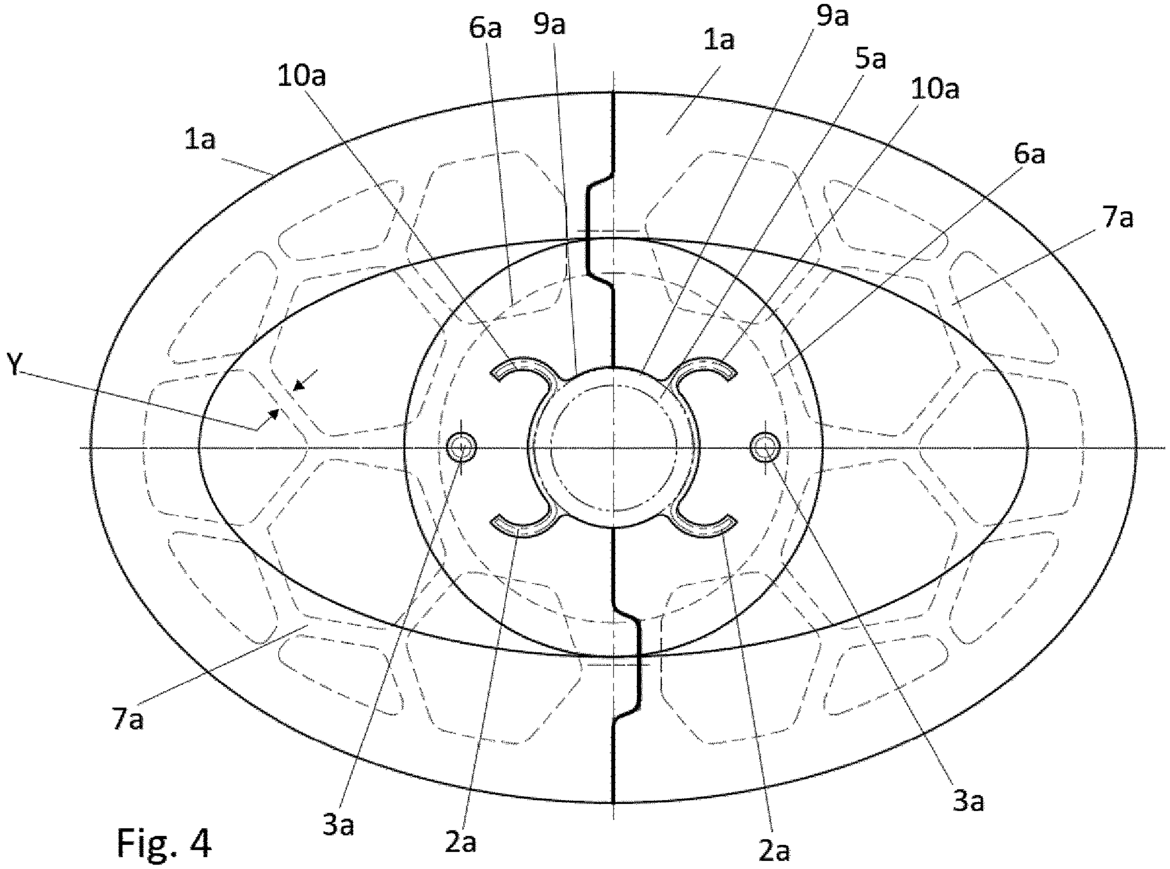
FIG. 4 shows a top view of the two shielding shoes in FIG. 3.

FIGS. 3 and 4 show an example of the disclosed shielding shoes 1*a*. The shielding shoes 1*a* have a semi-circular recess 9*a* to be received on the support 5*a*. Instead of the cast plate, two new holding clamps 2*a* made of highly heat-resistant stainless steel or cast stainless steel are welded once to the support 5*a* and covered with a ceramic fibre mat 4*a* towards the furnace chamber. In this example, the holding clamp 2*a* is c-shaped. In top view, this is a c-shaped component which is welded with its rear side to the support 5*a*.

To mount or dismount the new shielding shoe 1*a*, it is pushed onto or removed from the new holding clamps 2*a*. For this purpose, two curved slots 10*a* are provided in the shielding shoe 1*a* in the area of its semi-circular recess 9*a*, in which the two legs of the holding clamp 2*a* can be received. Due to the curved shape of the slots 10*a*, the shielding shoe 1*a* is held securely and the risk of stress cracks is minimised. Furthermore, the shielding shoe 1*a* rests on a circular supporting ring 6*a*.

The upper side of the shielding shoe 1*a* is formed by the shielding jacket 8*a*. The shielding jacket here has a uniform thickness X. Below the shielding jacket is the honeycomb-like structure 7*a*, which is also made of refractory cast concrete or refractory rammed concrete. This honeycomb structure is produced by pouring the concrete into a corresponding casting mould in which the future webs of the honeycombs are recessed. In this example, the honeycomb structure 7*a* has a uniform wall thickness Y.

To facilitate assembly/disassembly, a block hole 3*a* is provided in the shielding shoe 1*a*. During assembly/disassembly, a block with an eyelet is screwed into the block hole 3*a*, into which the hook of a lifting tool can then be hooked. For operation, the block hole 3*a* can be sealed with a refractory compound.

The new shielding shoe 1*a* is thermally pre-treated (up to 1,400° C. is possible). This enables permanent storage in a dry and frost-free place without any loss of quality.

In this example, two identical shielding shoes 1*a* are attached to the support 5*a*. What they have in common here is an elliptical floor plan (see FIG. 4). Accordingly, two holding clamps 2*a* are attached to the support 5*a*. The shielding jackets 8*a* of the two shielding shoes 1*a* form an umbrella-like shape, so that falling scale can slip off the shielding jacket 8*a*. This prevents or minimises disturbing deposits on the shielding shoe 1*a*.

The described embodiment has the following advantages:

1. Weight reduction of the shielding shoe 1*a* by at least 35%;
2. Easier assembly/disassembly due to the reduced dead weight and use of the new block for handling;
3. Only one-time welding work is required for the fastening the holding clamps 2*a* and the supporting ring 6*a*; and
4. Permanent storage time of the manufactured and thermally treated shielding shoe 1*a*.

The invention claimed is:

1. A shielding shoe (1*a*) for covering an opening in a bottom of a walking beam furnace, the shielding shoe having an upper side and a lower side, comprising:

a shielding jacket (8*a*) having a semi-circular recess (9*a*) configured to be taken up by a vertical support (5*a*) of the walking beam furnace, wherein the shielding shoe (1*a*) is formed from refractory cast concrete or refractory rammed concrete, and the shielding shoe (1*a*) has a honeycomb-like structure (7*a*) below the shielding jacket (8*a*) toward the lower side.

2. The shielding shoe (1*a*) according to claim 1, wherein the shielding jacket (8*a*) has a constant thickness (X) above the honeycomb-like structure (7*a*).

3. The shielding shoe (1*a*) according to claim 2, wherein the honeycomb-like structure (7*a*) has a uniform wall thickness (Y).

4. The shielding shoe (1*a*) according to claim 2, wherein the shielding shoe (1*a*) has curved slots (10*a*) in an area of the recess (9*a*) configured to allow the shielding shoe (1*a*) to be suspended on holding clamps (2*a*) fastened to the vertical support (5*a*).

5. The shielding shoe (1*a*) according to claim 2, wherein the shielding shoe (1*a*) has at least one block hole (3*a*) on its upper side.

6. The shielding shoe (1*a*) according to claim 1, wherein the honeycomb-like structure (7*a*) has a uniform wall thickness (Y).

7. The shielding shoe (1*a*) according to claim 6, wherein the shielding shoe (1*a*) has curved slots (10*a*) in an area of the recess (9*a*) configured to allow the shielding shoe (1*a*) to be suspended on holding clamps (2*a*) fastened to the vertical support (5*a*).

8. The shielding shoe (1*a*) according to claim 1, wherein the shielding shoe (1*a*) has curved slots (10*a*) in an area of the recess (9*a*) configured to allow the shielding shoe (1*a*) to be suspended on holding clamps (2*a*) fastened to the vertical support (5*a*).

9. The shielding shoe (1*a*) according to claim 8, wherein the slots (10*a*) are C-shaped from a top view.

10. The shielding shoe (1*a*) according to claim 8, wherein the shielding shoe (1*a*) has at least one block hole (3*a*) on its upper side.

11. The shielding shoe (1*a*) according to claim 1, wherein the shielding shoe (1*a*) has at least one block hole (3*a*) on its upper side.

12. A shielding shoe (1*a*) for covering an opening in a bottom of a walking beam furnace, the shielding shoe having an upper side and a lower side, comprising:

a shielding jacket (8*a*) having a semi-circular recess (9*a*) configured to be taken up by a vertical support (5*a*) of the walking beam furnace, wherein the shielding shoe (1*a*) is formed from refractory cast concrete or refractory rammed concrete, the shielding shoe (1*a*) has a honeycomb-like structure (7*a*) below the shielding jacket (8*a*) toward the lower side, the shielding jacket (8*a*) has a constant thickness (X) above the honeycomb-like structure (7*a*), the honeycomb-like structure (7*a*) has a uniform wall thickness (Y), the shielding shoe (1*a*) has curved slots (10*a*) in an area of the recess (9*a*) configured to allow the shielding shoe (1*a*) to be suspended on holding clamps (2*a*) fastened to the vertical support (5*a*), and the shielding shoe (1*a*) has at least one block hole (3*a*) on its upper side.

13. A walking beam furnace having at least one support (5*a*) projecting upward through an opening, comprising a pair of shielding shoes (1*a*), each shielding shoe (1*a*) of the pair of shielding shoes having an upper side and a lower side, and comprising:

a shielding jacket (8*a*) having a semi-circular recess (9*a*) configured to be taken up by a vertical support (5*a*) of the walking beam furnace, wherein each shielding shoe (1*a*) of the pair of shielding shoes is formed from refractory cast concrete or refractory rammed concrete, each shielding shoe (1*a*) of the pair of shielding shoes has a honeycomb-like structure (7*a*) below the shielding jacket (8*a*) toward the lower side attached to the support (5*a*), and each shielding shoe (1*a*) of the pair of shielding shoes is attached to the support (5*a*).

14. The walking beam furnace according to claim 13, comprising curved holding clamps (2*a*) fastened to the support (5*a*) into which each shielding shoe (1*a*) of the pair of shielding shoes is suspended.

15. The walking beam furnace according to claim 14, comprising a supporting ring (6*a*) fastened to the support (5*a*) on which each shielding shoe (1*a*) of the pair of shielding shoes rests on.

16. The walking beam furnace according to claim 13, comprising a supporting ring (6*a*) fastened to the support (5*a*) on which each shielding shoe (1*a*) of the pair of shielding shoes rests on.

17. The walking beam furnace according to claim 16, wherein half of the supporting ring (6*a*) and a respective holding clamp (2*a*) are formed as a one-piece component.

* * * * *